(12) United States Patent
Allain et al.

(10) Patent No.: US 6,435,346 B1
(45) Date of Patent: *Aug. 20, 2002

(54) INFLATABLE CAR FLOOD RESCUE RAFT

(76) Inventors: Mark Allain; Joseph Allain, Jr., both of 4932 Chantilly Dr., New Orleans, LA (US) 70126

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/887,421

(22) Filed: Jul. 2, 1997

Related U.S. Application Data

(63) Continuation-in-part of application No. 08/660,663, filed on Jun. 5, 1996, now Pat. No. 6,059,105.

(51) Int. Cl.$^7$ ................................................ B65D 85/68
(52) U.S. Cl. ...................................................... 206/335
(58) Field of Search ................................ 206/335, 522; 383/3, 108; 150/166, 167; 114/345, 270; 441/40–42

(56) References Cited

U.S. PATENT DOCUMENTS

| | | | | |
|---|---|---|---|---|
| 3,011,184 A | * | 12/1961 | Curcio | 441/40 |
| 3,667,625 A | * | 6/1972 | Lucas | 206/522 |
| 4,315,535 A | * | 2/1982 | Battle | 206/335 |
| 4,459,932 A | * | 7/1984 | Hildebrand | 114/270 |
| 4,573,202 A | * | 2/1986 | Lee | 206/522 |
| 4,773,456 A | * | 9/1988 | Rodgers | 206/335 |
| 5,113,779 A | * | 5/1992 | Amrein et al. | 114/270 |
| 5,184,564 A | * | 2/1993 | Robbins et al. | 114/270 |
| 5,273,473 A | * | 12/1993 | Allen | 441/40 |
| 5,287,904 A | * | 2/1994 | Smith et al. | 206/522 |
| 5,297,978 A | * | 3/1994 | Ramsey | 441/40 |
| 5,540,177 A | * | 7/1996 | Masters | 441/40 |
| 5,588,533 A | * | 12/1996 | Farison et al. | 206/522 |
| 5,601,462 A | * | 2/1997 | Harlow | 114/270 |
| 5,660,134 A | * | 8/1997 | Kim | 114/270 |
| 5,682,832 A | * | 11/1997 | Millard | 114/270 |

* cited by examiner

Primary Examiner—Luan K. Bui
(74) Attorney, Agent, or Firm—Jim Zegeer

(57) ABSTRACT

A vehicle flood flotation raft is comprised of a bottom panel member, a top panel member hermetically joined to the bottom panel member to form a hermetically sealed air chamber and an air valve is used for filling the air chamber with air. The top panel member has an exterior surface which is adapted to protect the upper surface from penetration by the undercarriage portions of the vehicle. The raft has a geometry such that it can be positioned around the driven wheels of the vehicle so that the driven wheels can be used to propel the flood rescue raft and vehicle thereon to safety. The flood flotation raft can also include inflatable side panel members at the sides of the top and bottom panel members, front and rear inflatable flap members secured to the bottom panel member, and a discrete flotation ballast can be attached to the vehicle flotation raft at the engine end thereof.

1 Claim, 5 Drawing Sheets

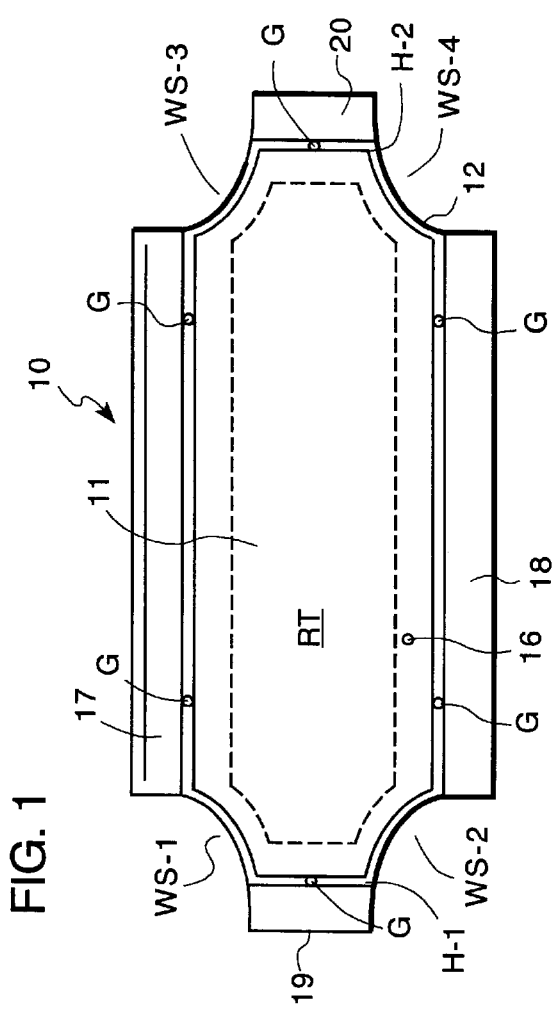
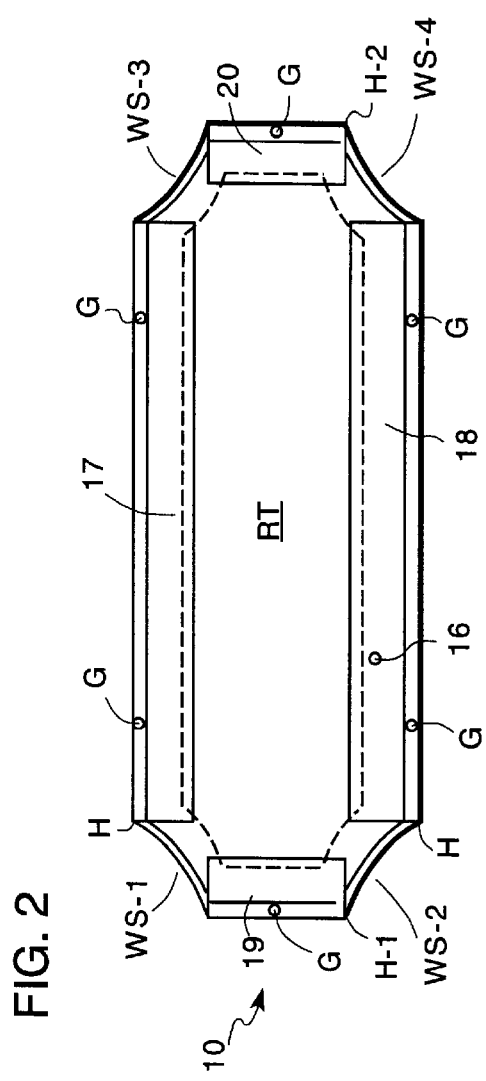

INFLATABLE CAR FLOOD RESCUE RAFT

REFERENCE TO RELATED APPLICATIONS

This invention is a continuation-in-part of our application Ser. No. 08/660,663 filed Jun. 5, 1996, U.S. Pat. No. 6,059,105 and entitled VEHICLE AND VALUABLE POSSESSION FLOOD PROTECTION APPARATUS AND METHOD which is incorporated herein by reference.

BACKGROUND AND BRIEF DESCRIPTION OF THE INVENTION

This invention relates to an apparatus and method for protecting automotive vehicles from damage by flood waters. We have discovered that when the flood water levels are at about one foot or greater above ground level, the average vehicle, such as a car or a pickup truck, in a flexible waterproof container will float. If the waterproof container has an upper edge that is at a level of at least greater in height than the flood water, and rain or splashing flood waters are prevented from entering the lower container portion and the lower portion is tethered or otherwise anchored to some fixed object such as a telephone pole, power pole, concrete slab, weight sets, etc., the car will be protected. Anchoring or otherwise tethering the container prevents the floating car from being damaged and damaging of other objects due to the movement given to it by the flowing flood waters. At the same time, tethering or anchoring the vehicle container and the vehicle prevents puncturing or other damage to the container. A number of preferred embodiments are disclosed in our above-referenced application Ser. No. 08/660,663.

THE PRESENT INVENTION

According to the present invention, instead of enveloping the vehicle with a waterproof enclosure, the present invention takes advantage of the discovery that, within about one foot of flood waters, a flotation container carrying a car floats to provide a car flood rescue flotation raft which, according to a preferred embodiment, incorporates a flotation chamber or ballast to offset the engine weight.

According to the present invention, a vehicle flotation raft has an inflatable bag which is preferably provided with one or more inflatable side and end flaps, and a flotation chamber or a ballast for securement to the engine end of the vehicle. The bag is unfolded (except for the end flaps) and slid into position under the car stationary on the ground or in the water. A rope attached to the front end grommets on the bag (and possibly the rear end in moving water) is used to facilitate positioning of the bag under the car or vehicle. Alternatively, the vehicle can be driven into position over the folded and deflated flotation raft. In the preferred embodiment, the geometry of the flotation raft is such that the vehicle wheels do not rest on the flotation raft. Air from a compressed air container or an air pump (driven from the cigarette lighter of the vehicle) is then introduced into the bag. Mechanically, a hand-pump or foot pump can also be used to inflate with air. When the bag is sufficiently inflated with the flaps unfolded and the flotation chamber or ballast attached to the end where the engine is located, the vehicle will float and can be pushed or, as described above, propelled to higher ground. The ballast is secured in place with straps or ropes attached to the grommets located on the periphery of the bag. If the vehicle is operable, the engine can be engaged at low speeds to drive the wheels (front or rear or all-wheel drive) to propel the vehicle and flotation raft to safety. If the car can be started, the bag can be deflated and stored after the car is driven off of the bag.

BRIEF DESCRIPTION OF THE DRAWINGS

The above and other objects, advantages and features of the invention will become more apparent when considered with the following specification and accompanying drawings wherein:

FIG. 1 is a top plan view of the car flood rescue raft incorporating the invention with the flaps extended, FIG. 2 is a top plan view of the car flood rescue raft of the present invention showing the flaps folded.

DETAILED DESCRIPTION OF THE INVENTION

Figure 3:
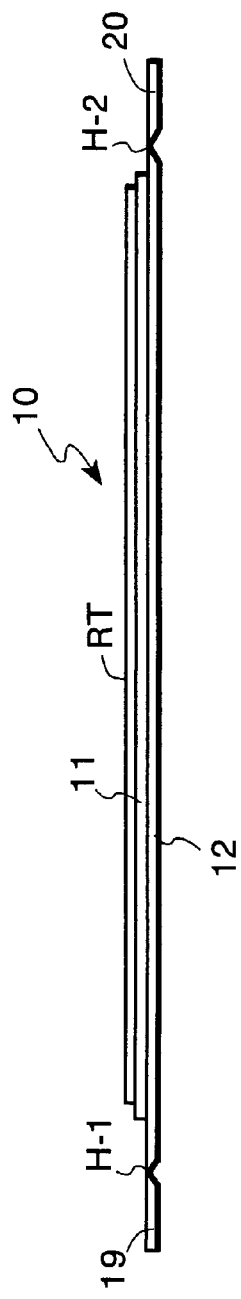
FIG. 3 is a side view of the car flood rescue raft according to the invention.
Figure 4:
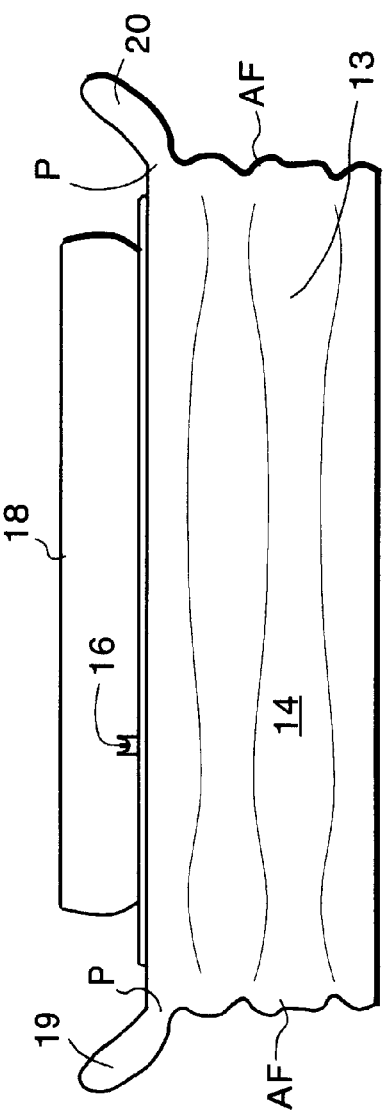
FIG. 4 is a side view showing the inflated car flood rescue raft of the present invention.
Figure 5:
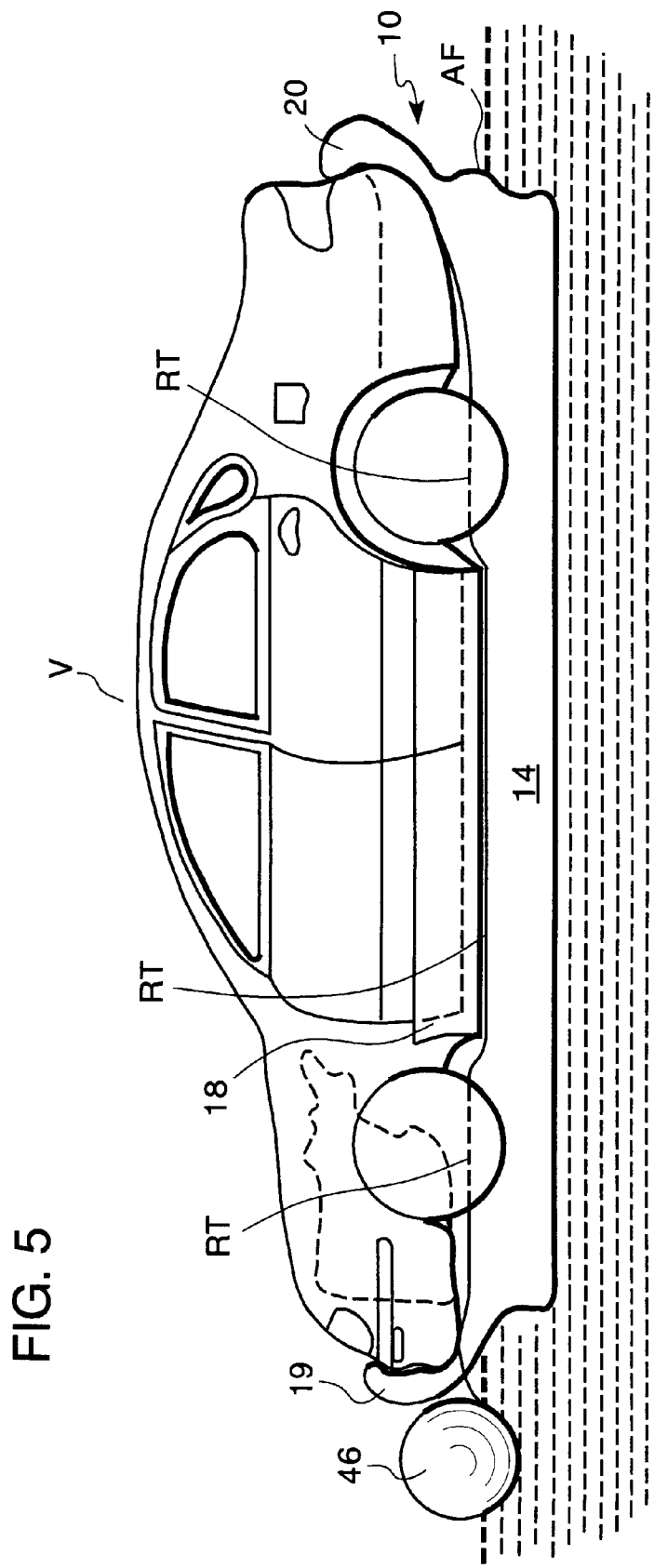
FIG. 5 is a side elevation view showing a floating vehicle on the vehicle flotation raft of the present invention with the flotation chamber to offset the engine weight attached.

Referring now to FIGS. 1, 2 and 3, a vehicle flotation raft 10 is provided with a top cover 11 hermetically sealed and joined along its edges 12 to the upper edges of lower flotation chamber portion 13 to form a main inflatable flotation chamber 14 (FIG. 4). A valve 16 is provided for inflating chamber 14. Side flaps 17 and 18 and end flaps 19 and 20 are hingedly connected to the top and bottom members 11 and 12 and are coupled by passageways P (FIG. 4) so that as the filling gas (air) is introduced through valve 16, the attached inflatable flaps 17, 18, 19 and 20 are also inflated to provide additional flotation. The top member 11 has a rubber or plastic top RT so that when it engages the underside of the vehicle V (FIG. 5) it is not damaged or ruptured by any sharp undercarriage protrusions and the like. Grommets G are provided for attaching ropes or straps. It will be noted that the geometry of the flotation raft 10 has wheel spaces WS-1, WS-2, WS-3 and WS-4.

A flotation chamber ballast 46 (FIG. 5 and FIG. 8B) is provided for coupling to the engine end (typically the front of the vehicle) so as to assure that the vehicle flotation raft 10 is maintained relatively level. Flotation or ballast 46 is described in greater detail in our application Ser. No. 08/660,663. The hinge connections for the front and rear flotation flaps 19 and 20 are indicated at H1 and H2 in FIG. 3. Similar hinges are provided for the side flotation flaps 17 and 18. Snap fasteners 32, 33 are provided for attaching adjustable length belts to hold the flotation chamber 46 to the front or rear of the vehicle (depending upon where the engine is located).

Figure 8B:
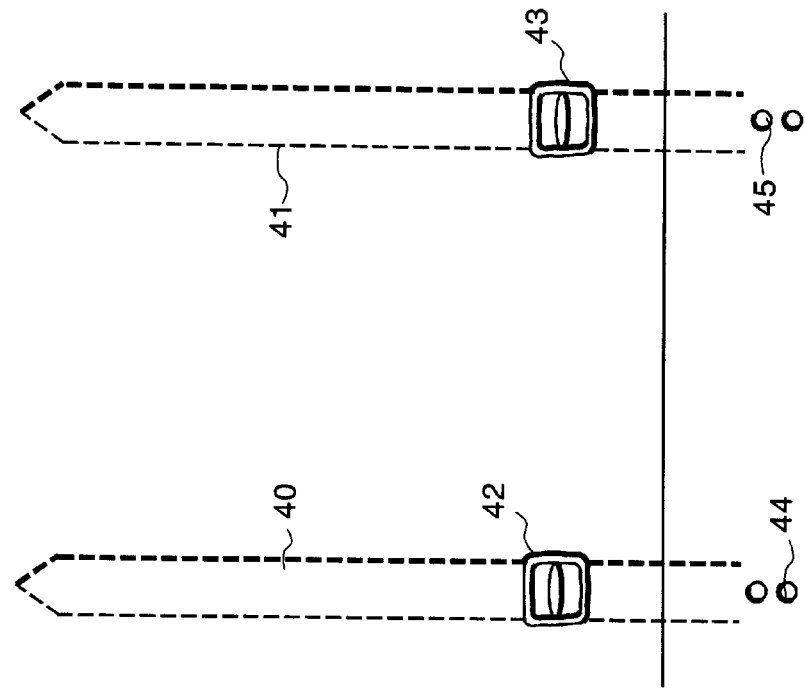
FIG. 8B is a diagrammatic illustration of the flotation chamber used in the invention.
Figure 8A:
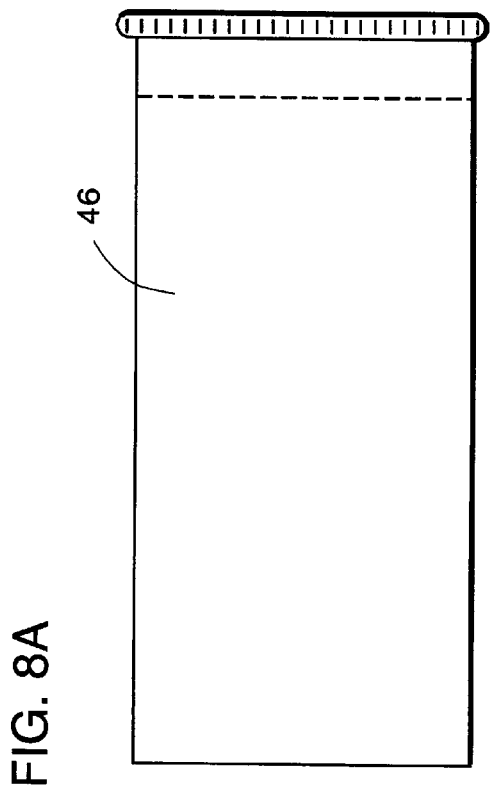
FIG. 8A is a diagrammatic illustration of a strap for the flotation chamber.

The flotation container or ballast 46 is shown in FIG. 8A and the straps for securing same with the snap cap is shown in FIG. 8B. Straps 40, 41 are provided with buckles 42, 43 for adjusting the tension in the straps and metal snap caps 44, 45 are provided for attaching the belt straps to the bag which may be provided with corresponding fasteners. The top of ballast container 46 is removable so that the vehicle with flood flotation raft can be stored therein if desired. In addition, the ballast flotation container is preferably about 30 cubic feet and, while preferably round, can be square or any other configuration. As described earlier, this air-tight ballast container is attached to the end of the vehicle flotation raft over which the engine compartment of the vehicle is located.

FIG. 4 is a section through the vehicle flotation raft 10 in an inflated condition without a vehicle thereon. Note that the side flaps 17 and 18 (only 18 shown in FIG. 4) are extended in an upward direction as well as the end flaps 19 and 20. The accordion-like folded sides AF expand to cause surface RT to engage the bottom portion of the vehicle surface.

It will be appreciated that instead of the flood protection raft being dimensioned to fit beneath the carriage, a portion can be positioned beneath the undercarriage and wheels or just on their wheels alone. It will also be appreciated that the vehicle wheels or tires, being filled full of air, also can be utilized to augment or serve as part of the flotation used to float the entire vehicle during the flood conditions. Moreover, when the vehicle wheels are used as part of the total flotation required to float the vehicle in the flood waters, the front wheels (if it is a front-wheel drive vehicle) or the rear wheels (if it is a rear-wheel drive vehicle) can be used to provide propulsion and steerage if the wheels are driven at low speeds.

It will be appreciated that as indicated in our application Ser. No. 08/660,663, anchors or tethering devices may be utilized to prevent the vehicle and the raft with the vehicle thereon from floating away in flood waters. Moreover, as described earlier, the flotation raft is preferably positioned between the wheels and the wheels, if it is a front-wheel or rear-wheel drive car, may be used for propulsion purposes when they engage the water and also provide some of the flotation used for protecting the vehicle from the flood waters.

Figure 6:
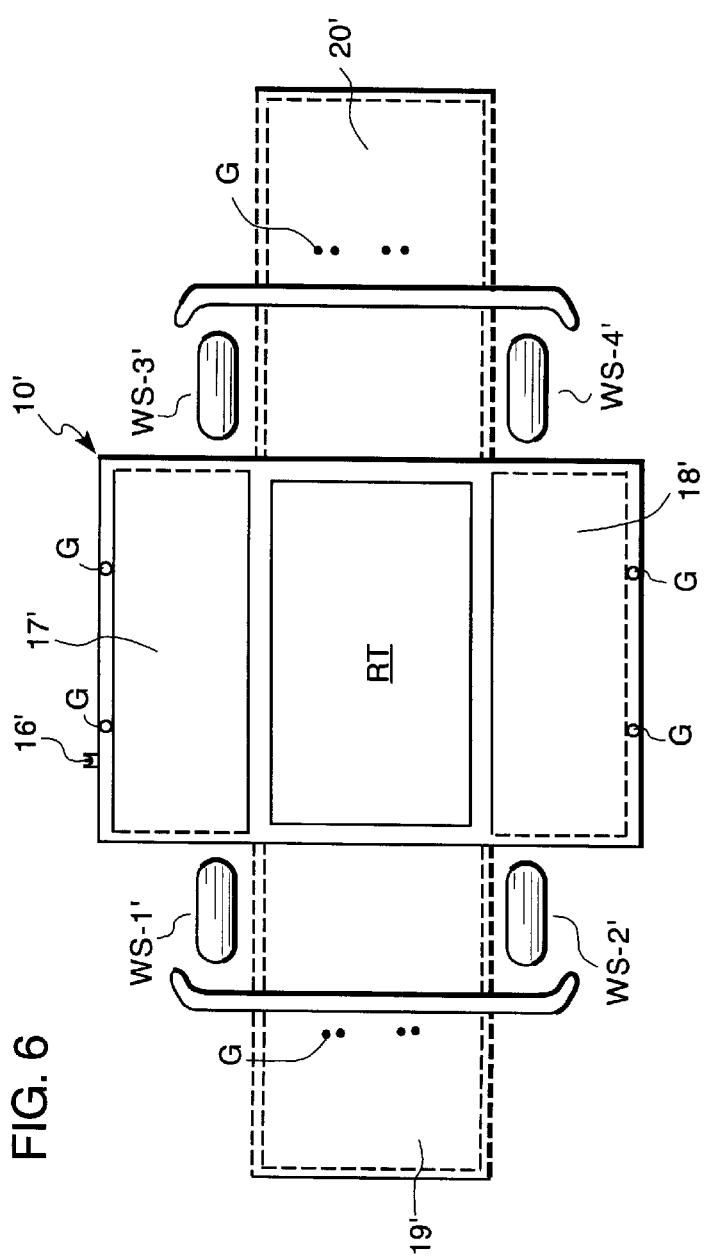
FIG. 6 is a top plan view of a second embodiment of the invention showing how the geometry of the flotation raft is such that the vehicle wheels do not rest thereon and with the side flaps extended and showing a vehicle positioned thereover.
Figure 7:
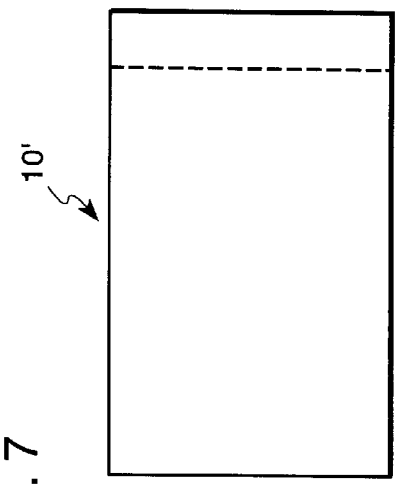
FIG. 7 is a top view of the flotation raft folded.

In the second embodiment shown in FIG. 6, the procedure is as follows:

Referring to FIG. 6, when the car is immobilized in flood waters, rescue is accomplished by use of the vehicle flotation raft or rescue bag 10'. The raft or bag 10' is unfolded (except for the flaps) and slid into position under the car stalled in the water. In moving water a rope is attached to the front-end grommets G and may be used to facilitate positioning the bag under the vehicle. Air from a compressed air container, or an air pump which is attached to the cigarette lighter terminal, is then introduced into the bag. A mechanical air pump may also be used to introduce the air. When the bag is sufficiently inflated with the flaps unfolded and one or more flotation ballast attached to the end where the engine is located, the flotation raft and vehicle will float and can be pushed or propelled to higher ground and secured in place with the straps or ropes attached to the grommets located at the periphery of the bag. If the car can be started, the bag can be deflated and removed and stored after the car is driven off the bag.

While a preferred embodiment of the invention has been illustrated and described, it will be appreciated that this, other embodiments, adaptations and modifications of the invention will be readily apparent to those skilled in the art.

What is claimed is:

1. A vehicle flood rescue raft for a vehicle having driven wheels comprising in combination:

a bottom panel member, a top panel member, and means hermetically joining said top and bottom panel members to form a hermetically sealed air chamber and valve means for filling said air chamber with air, said top panel member having an exterior surface, said air chamber having a capacity sufficient to float said vehicle in flood waters, said exterior surface being adapted to protect said upper surface from penetration by the undercarriage portions of the vehicle, said raft having a geometry such that it can be positioned around said driven wheels of said vehicle so that said driven wheels can be used to propel said flood rescue raft and vehicle thereon to safety, further including a discrete flotation chamber and means to secure said flotation chamber to the end of said car flood rescue raft at the end thereof positioned under the engine of said vehicle.

* * * * *